United States Patent [19]

Adachi et al.

[11] Patent Number: 5,189,619
[45] Date of Patent: Feb. 23, 1993

[54] AI-BASED ADAPTIVE VEHICLE CONTROL SYSTEM

[75] Inventors: Kunihiko Adachi; Norikazu Endo; Hironori Miyakoshi, all of Susono, Japan

[73] Assignee: Toyota Jidosha Kabushiki Kaisha, Toyota, Japan

[21] Appl. No.: 561,827

[22] Filed: Aug. 2, 1990

[30] Foreign Application Priority Data

Sep. 5, 1989 [JP] Japan .................................. 1-230707
Sep. 5, 1989 [JP] Japan .................................. 1-230708

[51] Int. Cl.$^5$ .......................... G08G 1/16; B60K 31/00
[52] U.S. Cl. ................................. 364/426.04; 180/170; 340/903
[58] Field of Search ....................... 364/424.05, 426.04, 364/151, 160, 157; 395/903, 905, 913; 340/901, 902, 903, 904; 180/170

[56] References Cited

U.S. PATENT DOCUMENTS

| | | | |
|---|---|---|---|
| 4,621,705 | 11/1986 | Etoh | 364/426.04 X |
| 4,628,317 | 12/1986 | Nishikawa et al. | 340/903 |
| 4,670,845 | 6/1987 | Etoh | 340/903 X |
| 4,757,450 | 7/1988 | Etoh | 364/426.04 |
| 4,809,175 | 2/1989 | Hosaka et al. | 364/426.04 X |
| 4,829,434 | 5/1989 | Karmel et al. | 364/424.1 |
| 4,958,288 | 9/1990 | Takahashi | 364/426.04 |
| 5,005,133 | 4/1991 | Takahashi | 364/426.04 |
| 5,053,979 | 10/1991 | Etoh | 364/424.05 X |

FOREIGN PATENT DOCUMENTS 60-215432 10/1985 Japan .
61-6031 1/1986 Japan .
63-38056 2/1988 Japan .
63-265309 11/1988 Japan .

OTHER PUBLICATIONS

Lotfi A. Zadeh, "Making Computers think like people," *IEEE Spectrum*, Aug. 1984, pp. 26-32.

Primary Examiner—Parshotam S. Lall
Assistant Examiner—Collin W. Park
Attorney, Agent, or Firm—Oblon, Spivak, McClelland, Maier & Neustadt

[57] ABSTRACT

An AI-based adaptive vehicle control system which controls the speed of a vehicle in accordance with the driving characteristics of the driver. In effecting the follow-up driving which corresponds to the driving characteristics of the driver, the vehicle environment such as the distance between the vehicle and the vehicle in front, the relative speed, and the relative position, and the running state such as the speed and the steering angle of the vehicle itself are detected, and a danger index is calculated from the detected vehicle environment and running state in accordance with the driver's sense of driving. The danger index is calculated by the fuzzy induction from the membership functions which are determined in advance in accordance with a general driver's sense of driving. The running state of the vehicle such as the speed is controlled in accordance with the danger index. When the manipulated variable is changed by the driving operation of the driver, the danger index is adjusted in accordance with the amount of change. The change by the driving operation of the driver is reflected as the change in the membership functions. Thus, the calculated danger index gradually agrees with the driving characteristic of the driver.

6 Claims, 17 Drawing Sheets

FIG. 3

| INPUT | CURRENT SPEED | S | M | B |
| --- | --- | --- | --- | --- |
| | RELATIVE SPEED | N | Z | P |
| | DISTANCE BETWEEN AUTOMOBILES | S | M | B |
| OUTPUT | DEGREE OF DANGER | VS | S | M | B |

VS: VERY SMALL        B: BIG           P: POSITIVE
S: SMALL              N: NEGATIVE
M: MEDIUM             Z: ZERO

FIG. 4

| CURRENT SPEED | RELATIVE SPEED | DISTANCE BETWEEN AUTOMOBILES | DEGREE OF DANGER |
|---|---|---|---|
| B | N | S | B |
| B | Z | S | M |
| B | P | S | S |

CURRENT SPEED (Km/h)

RELATIVE SPEED (Km/h)

FIG. 6

| | | | | |
|---|---|---|---|---|
| INPUT | CURRENT SPEED | S | M | B |
| | DIFFERENCE IN DISTANCE BETWEEN AUTOMOBILES | N | Z | P |
| | RELATIVE SPEED | N | Z | P |
| OUTPUT | MANIPULATED VARIABLE | NS | NB | Z | PS | PB |

NS: NEGATIVE SMALL    PS: POSITIVE SMALL
NB: NEGATIVE BIG      PB: POSITIVE BIG

FIG. 7

| CURRENT SPEED | DIFFERENCE IN DISTANCE BETWEEN AUTOMOBIES | RELATIVE SPEED | MANIPULATED VARIABLE |
|---|---|---|---|
| B | N | N | NB |
| B | Z | N | NS |
| B | P | N | Z |
| B | N | Z | NS |
| B | Z | Z | Z |
| B | P | Z | Z |

CURRENT SPEED (KM/H)

RELATIVE SPEED (KM/H)

DIFFERENCE IN DISTANCE
BETWEEN AUTOMOBILES (M)

MANIPULATED VARIABLE (%)

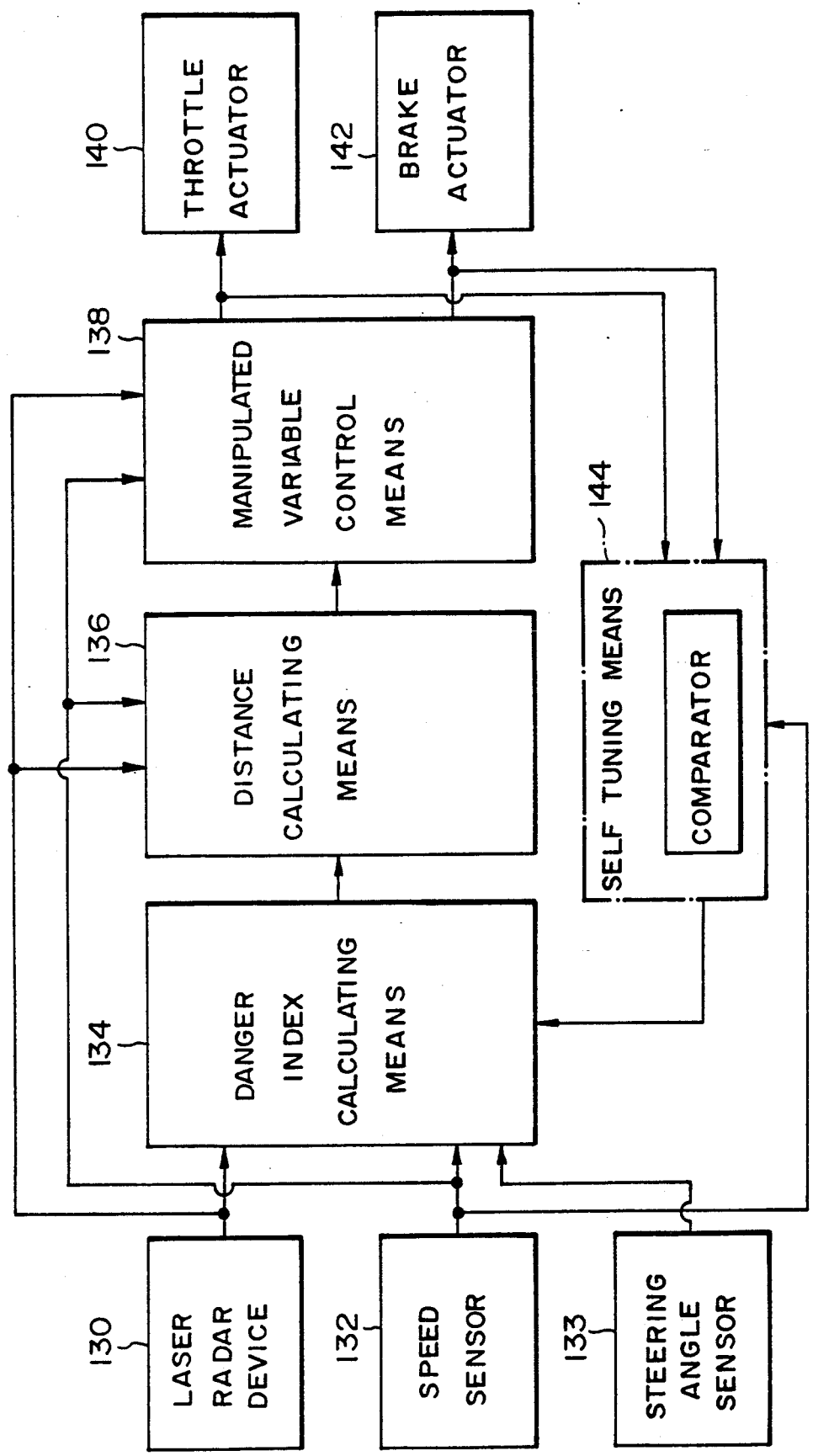

FIG. 10

| | | | | | | |
|---|---|---|---|---|---|---|
| INPUT | CURRENT SPEED | S | | M | | B |
| | RELATIVE SPEED | N | | Z | | P |
| | DISTANCE BETWEEN AUTOMOBILES | S | | M | | B |
| | RELATIVE POSITION | L | | Z | | R |
| | STEERING ANGLE | L | | Z | | R |
| OUTPUT | DEGREE OF DANGER | VS | S | M | | B |

VS: VERY SMALL  
S: SMALL  
M: MEDIUM

B: BIG  
N: NEGATIVE  
Z: ZERO

P: POSITIVE  
L: LEFT  
R: RIGHT

FIG. 11

| CURRENT SPEED | RELATIVE SPEED | DISTANCE BETWEEN AUTOMOBILES | RELATIVE POSITION | STEERING ANGLE | DEGREE OF DANGER |
|---|---|---|---|---|---|
| B | N | S | N | N | B |
| B | N | S | N | L | M |
| B | N | S | L | R | S |
| B | N | M | N | N | M |
| B | N | M | N | L | S |
| B | N | M | L | R | VS |

FIG. 13

| CURRENT SPEED | DIFFERENCE IN DISTANCE BETWEEN AUTOMOBILES | RELATIVE SPEED | MANIPULATED VARIABLE |
|---|---|---|---|
| B | N | N | NB |
| B | Z | N | NS |
| B | P | N | Z |
| B | N | Z | NS |
| B | Z | Z | Z |
| B | P | Z | Z |

AI-BASED ADAPTIVE VEHICLE CONTROL SYSTEM

BACKGROUND OF THE INVENTION

1. Field of the Invention

The present invention relates to an AI-based adaptive vehicle control system and, more particularly, to an AI-based adaptive vehicle control system which is capable of performing a follow-up driving matching with the driving characteristics of a driver by controlling a driving condition of a vehicle in accordance with a dynamic behavior of a driver obtained through learning of the driving characteristics of the driver.

2. Description of the Related Art

A vehicle running state control apparatus has heretofore been known which is composed of a radar device mounted on an automobile so as to constantly monitor the distance between the automobile and the automobile in front and the relative speed and accelerate or decelerate the automobile in correspondence with the degree of danger.

The system disclosed in Japanese Patent Laid-Open No. 91500 (1985) is known as an example of this type of running state control apparatus. FIG. 14 is a schematic block diagram of this system. In FIG. 14, a radar device 10 having an antenna ANT mounted on an automobile detects the distance between this automobile and the automobile running in front and the relative speed, and a speed sensor 12 obtains the running speed of the automobile itself.

The detected distance between the automobiles, the relative speed and the running speed of the automobile itself are supplied to a signal processor 14. The signal processor 14 calculates the danger index from these detection signals. More specifically, the appropriate distance between the automobiles which is necessary for stopping the automobile without bumping against the automobile in front when the automobile in front decelerates is obtained from the running state of the automobile in front and the running state of the automobile itself and the danger index D is calculated from the following equation:

$$D = \log \text{(appropriate distance between the automobiles / actual distance between the automobiles)}$$

The danger index calculated by the signal processor 14 is supplied to a display unit 16 and displayed or the signal processor 14 judges whether to accelerate or decelerate the automobile from the danger index and supplies a command to the actuator so as to automatically control the brake and the accelerator. In this way, it is possible to follow the automobile in front with safety.

In this system, however, the appropriate distance between the automobiles and the danger index are uniformly determined by the relative running state and cannot fit running state which is different depending upon the vehicle environment and the driver.

To solve this problem, a control apparatus such as that disclosed in Japanese Patent Laid-Open No. 6031/1986 has conventionally been proposed. In this apparatus, a calculator 24 calculates a distance between the automobiles to be set, namely, the appropriate distance between the automobiles on the basis of the detection signals of a vehicle speed detecting means 18 for detecting the running speed of the automobile and the means 20 for detecting the distance between the automobile and the automobile in front, and the acceleration and deceleration is controlled on the basis of the thus-set distance between the automobiles, as shown in a block diagram of FIG. 15. If the driver wants to change the set distance between the automobiles in accordance with the running state, the driver turns the knob of a manual distance adjusting means 22 so as to change the correction coefficient used for calculation of the distance between the automobiles to be set, thereby correctively increasing or reducing the appropriate distance between the automobiles.

In this conventional apparatus, however, it is necessary to operate the knob whenever the driver wants to change the appropriate distance between the automobiles. The operation for setting the distance at a desired value by turning the knob each time is cumbersome. The merit of automatic follow-up driving existing in that the driver has only to concentrate on the steering operation is evacuated and since it is difficult for the driver to set the distance at a desired value by turning the knob during driving, the attention of the driver is directed toward the handling of the knob, which is a problem from the point of view of safety.

SUMMARY OF THE INVENTION

Therefore, an object of the present invention is to eliminate the above-described problems in the conventional vehicle running state control apparatus and to provide an AI-based adaptive vehicle control system which is capable of changing a degree of danger and an appropriate distance between a vehicle and the vehicle in front in accordance with a dynamic behavior of a driver which exactly reflects a driving characteristics of the driver, thereby realizing a follow-up driving of a vehicle in which the control system of the vehicle adapts itself to the driving characteristics of the driver by the use of the parameters automatically adjusted such as the degree of danger and the appropriate vehicle distance.

To achieve this aim, an AI-based adaptive vehicle control system according to the present invention comprises an environment judging means for judging the vehicle environment, a state judging means for judging the running state of the vehicle, a danger index calculating means for calculating a danger index from the vehicle environment and the running state of the vehicle in accordance with the driver's sense of driving, a control means for optimizing the running state in accordance with the calculated danger index, an adjusting means for detecting a change in the optimized running state by the driving operation of the driver and adjusting the danger index in accordance with the change.

As the vehicle environment, the distance between the automobile and the automobile in front, the relative speed, the relative position, etc. are detected and as the running state, the speed, the steering angle, etc. of the automobile itself are detected. The calculating means calculates the danger index from the vehicle environment and the running state by the fuzzy induction using the membership functions which are determined in advance in accordance with the driving characteristics of drivers in general.

When the running state optimized in accordance with the thus-calculated danger index is changed by the driving operation of the driver, the membership functions are changed in accordance with the change, thereby adjusting the danger index in accordance with the driving characteristics of the driver.

In this way, since the danger index is gradually adjusted by the driving operation of the driver such as the operation of the accelerator or the brake, the evaluation of the degree of danger gradually agrees with the driving characteristics of the driver, thereby enabling safe and comfortable follow-up driving.

The above and other objects, features and advantages of the present invention will become clear from the following description of the preferred embodiments thereof, taken in conjunction with the accompanying drawings.

BRIEF DESCRIPTION OF THE DRAWINGS

FIG. 3 is a table showing the evaluation criteria on the parameters for controlling the degree of danger in the embodiment shown in FIG. 1;

FIG. 4 is a table showing the rules for fuzzy control of the degree of danger in the embodiment shown in FIG. 1;

FIG. 6 is a table showing the evaluation criteria on the parameters for controlling the manipulated variable in the embodiment shown in FIG. 1;

FIG. 7 is a table showing the rules for fuzzy control of the manipulated variable in the embodiment shown in FIG. 1;

FIG. 9 is another embodiment of a block diagram of an AI-based adaptive vehicle control system according to the present invention;

FIG. 10 is a table showing the evaluation criteria on the parameters for controlling the degree of danger in the embodiment shown in FIG. 9;

FIG. 11 is a table showing the rules for fuzzy control of the degree of danger in the embodiment shown in FIG. 9;

FIG. 13 is a table showing the rules for fuzzy control of the manipulated variable in the embodiment shown in FIG. 9.

DESCRIPTION OF THE PREFERRED EMBODIMENTS

Embodiments of the present invention will be explained hereinunder with reference to the accompanying drawings.

First Embodiment

Figure 1:
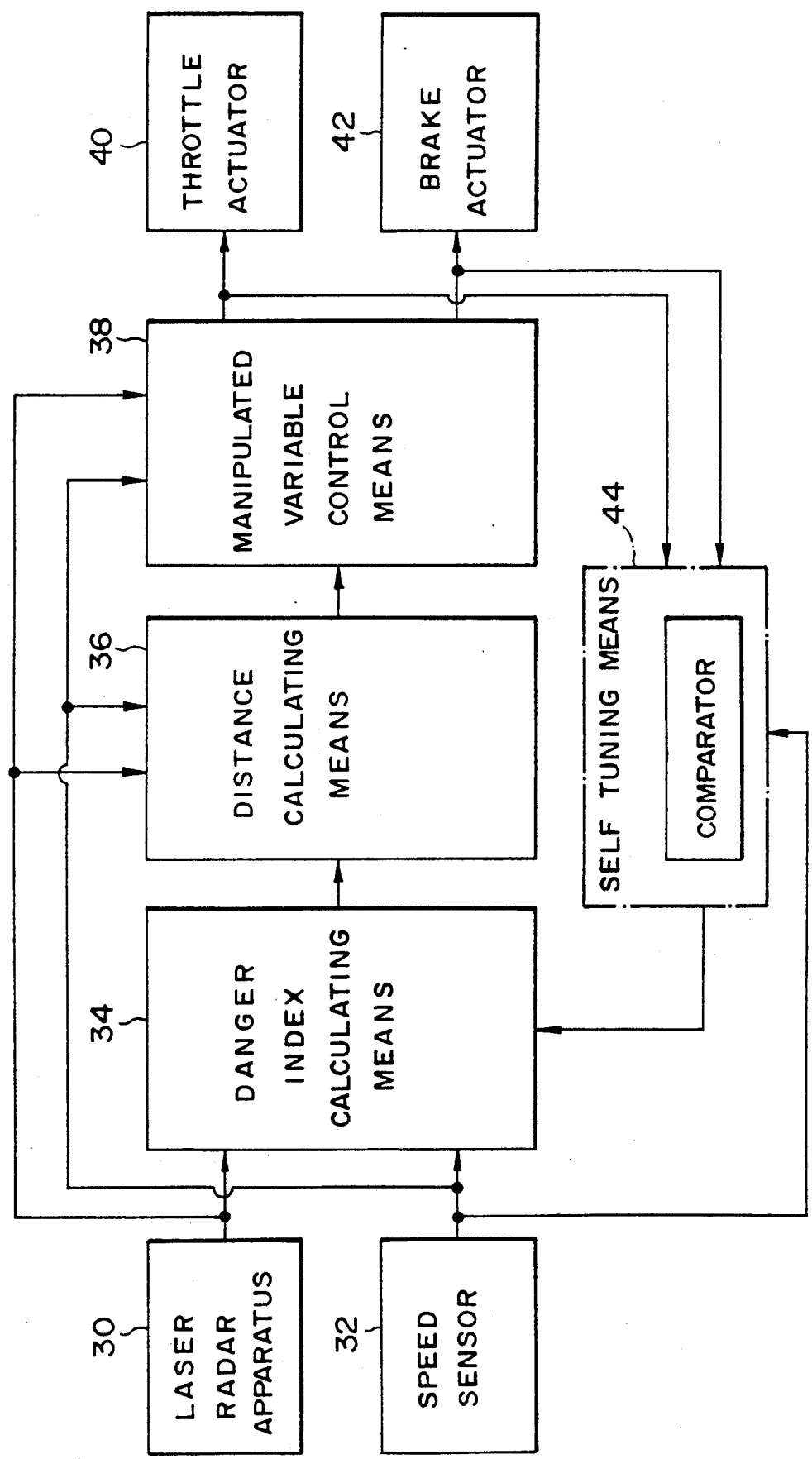
FIG. 1 is a block diagram of an embodiment of an AI-based adaptive vehicle control system according to the present invention.

FIG. 1 is a block diagram of the structure of a first embodiment of an AI-based adaptive vehicle control system according to the present invention. In FIG. 1, a laser radar apparatus 30 mounted on an automobile as an environment judging means projects a laser beam at a predetermined pulse interval so as to detect the distance between the automobile and the automobile in front and the relative speed from the laser beam reflected from the automobile in front.

The running speed of the automobile is detected by a speed sensor 32 as a state judging means. The distance between the automobiles, the relative speed and the running speed of the automobile detected by the laser radar apparatus 30 and the speed sensor 32 are supplied to a danger index calculating means 34. The danger index calculating means 34 calculates the danger index which agrees with the driver's sense by fuzzy induction based on the supplied detection signals as parameters. The fuzzy induction adopted by the danger index calculating means 34 will be explained in detail hereinunder with reference to FIGS. 3 to 5.

FIG. 3 shows the criteria on the parameters which are supplied from the laser radar apparatus 30 and the speed sensor 32. As shown in FIG. 3, three evaluation criteria S (Small, high), M (Middle) and B (Big, low) are allotted to the running speed of the automobile and the distance between the automobiles, and evaluation criteria N (Negative), Z (Zero) and P (Positive) are allotted to the relative speed. To the danger index to be calculated are allotted four evaluation criteria VS (Very Small), S (Small), M (Middle) and B (Big, large).

FIG. 4 shows the rules for fuzzy control represented by the evaluation criteria which are allotted to the respective parameters. The rules for fuzzy control adopt a rule which agrees with a general driver's sense. For example, the first row in the table shows the rule that if the running speed of the automobile is B (high), the relative speed is N (negative) and the distance between the automobile and the automobile in front is S (short), the degree of danger is B (large). The third row in the table shows the rule that if the running speed of the automobile is B (high), the relative speed is P (positive) and the distance between the automobile and the automobile in front is S (short), the degree of danger is S (small).

Figure 5A:
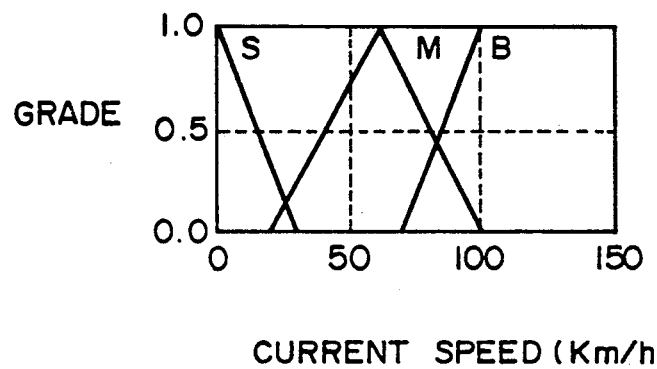
FIGS. 5(A) to 5(D) are graphs showing the membership functions in the embodiment shown in FIG. 1.
Figure 5B:
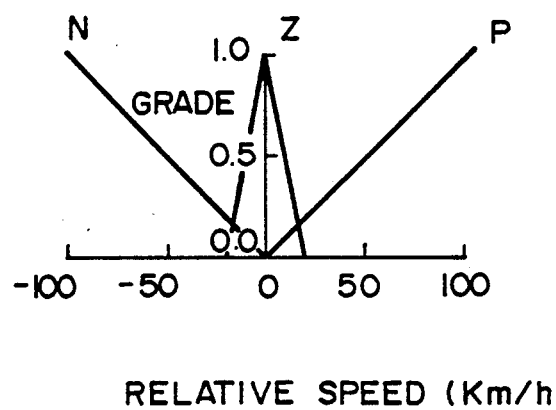
Figure 5D:
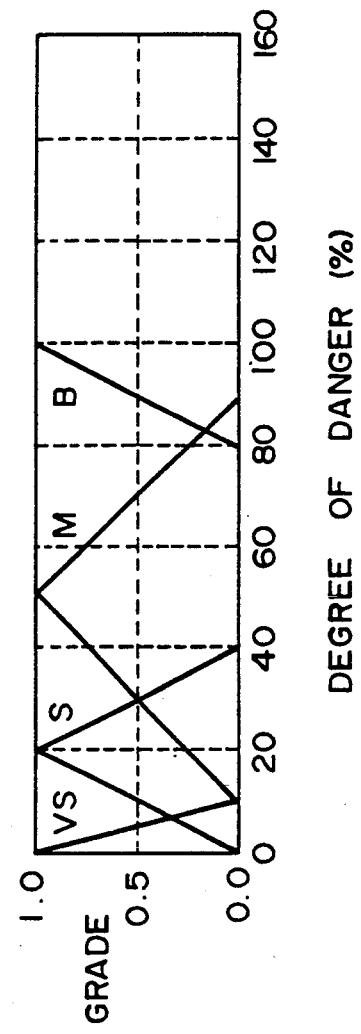
Figure 5C:
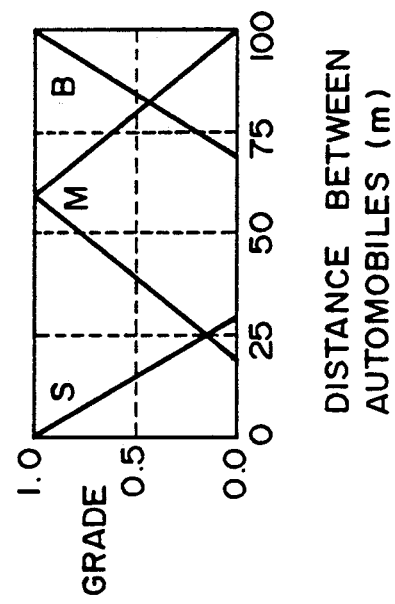

FIGS. 5(A) to 5(D) show the membership functions of the evaluation criteria allotted to the respective parameters, wherein FIG. 5(A) shows the membership functions of S (low), M (medium) and B (high) of the vehicle speed, FIG. 5(B) shows the membership functions of N (negative), Z (zero) and P (positive) of the relative speed, FIG. 5(C) shows the membership functions of S (short), M (medium) and B (long) of the distance between the automobiles, and FIG. 5(D) shows the membership functions of VS (very small), S (small), M (medium) and B (large) of the degree of danger. As well known, the membership function represents the degree to which a physical quantity fits a person's sense in the form of a grade. For example, in the membership functions of the running speed of the automobile in FIG. 5(A), when the running speed of the automobile is 50 Km/h, the grade of the respective evaluation criteria are S (low) = B (high) = 0
M (medium) = 0.75

That is, the running speed of 50 Km/h is judged to be medium at a grade of 0.75 by a general driver's sense.

The danger index calculating means 34 inputs the parameter values supplied from the laser radar apparatus 30 and the speed sensor 32 and obtains the grades of the evaluation criteria from the membership functions of these parameters. For example, when the detected values are Speed of the automobile = 100 Km/h
Relative speed = −50 Km/h Distance between the automobiles = 25 m
the grades of the evaluation criteria are
Speed of the automobile:
  S = M = 0
  B = 1.0
Relative speed:
  P = Z = 0
  N = 0.5
Distance between the automobiles:
  S = 0.2
  M = 0.2
  B = 0

From these grades, the degree of satisfaction of a rule for fuzzy control, which is the basis rule, shown in FIG. 4 is evaluated. In the above-described example,
  Grade of the speed B of the automobile = 1.0
  Grade of the relative speed N = 0.5
  Grade of the distance S between the automobiles = 0.2
and the degree of satisfaction in the conditional part of the rule is:

$$1.0 \times 0.5 \times 0.2 = 0.1$$

The membership function of the degree S of danger in the conclusive part of the rule is multiplied by the degree of satisfaction in the conditional part, thereby correcting the membership function of the degree S of danger in correspondence with the degree of satisfaction.

This operation is carried out with all the rules for fuzzy control in FIG. 4 so as to correct the membership functions of the conclusive parts in correspondence with the degrees of satisfaction. The logic sum of these corrected membership functions is then obtained. By calculating the barycenter of the logical sum, it is possible to calculate the degree of danger which agrees with the driver's sense.

The degree of danger calculated by the danger index calculating means 34 is supplied to a distance calculating means 36 for calculating the appropriate distance between the automobile and the automobile in front. The distance calculating means 36 calculates the appropriate distance between the automobile and the automobile in front on the basis of the thus-supplied danger index, the relative speed supplied from the laser radar apparatus 30 and the running speed of the automobile supplied from the speed sensor 22. More specifically, the reference distance $L_0$ between the automobiles which allows the automobile to stop without bumping against the automobile in front is first obtained from the relative speed Vr and the running speed V of the automobile in accordance with the following formula.

$$L_0 = V \times \tau + (V_s^2 - V^2)/2\alpha$$

$$V_s = V + V_r$$

wherein $\tau$ represents the idle running time of the automobile, and $\alpha$ the degree of deceleration.

The reference distance $L_0$ between the automobiles is corrected by the danger index D calculated by the danger index calculating means 34, thereby obtaining the appropriate distance L between the automobiles.

$$L = G1 \times (1+D) \times L_0$$

wherein G1 represents the gain of the distance between the automobiles.

The thus-calculated appropriate distance L between the automobiles is supplied to a manipulated variable control means 38. The manipulated variable control means 38 calculates a manipulated variable which is to be supplied to a throttle actuator 40 and a brake actuator 42 to optimize the vehicle speed on the basis of the appropriate distance between the automobiles by fuzzy induction in the same way as the danger index calculating means 34.

FIG. 6 shows the criteria on the parameters which are used for fuzzy induction in the same way as FIG. 3. To the running speed of the automobile and the relative speed which are supplied to the manipulated variable control means 38 together with the appropriate distance between the automobiles, the three evaluation criteria S, M, B and N, Z, P are respectively allotted in the same way as in FIG. 3. The difference in the distance between the automobiles represents the difference between the appropriate distance between the automobiles and the actual distance between the automobiles, and to the parameter thereof, the evaluation criteria N (Negative, shorter than the appropriate distance), Z (Zero, appropriate distance) and P (Positive, longer than the appropriate distance) are allotted. To the manipulated variable, which is an output, five evaluation criteria NS (Negative Small, small deceleration), NB (Negative Big, large deceleration), Z (maintenance of the current speed), PS (Positive Small, small acceleration) and PB (Positive Big, large acceleration) are allotted.

FIG. 7 shows the rules for fuzzy control represented by the evaluation criteria which are allotted to the respective parameters. The rules for fuzzy control adopt a rule which agrees with a general driver's sense in the same ay as the rules shown in FIG. 4. For example, the first row in the table shows the rule that if the running speed of the automobile is B (high), the difference in distance between the automobiles is N (shorter than the appropriate distance) and the relative speed is N (negative), the manipulated variable is NB (large deceleration). The sixth row in the table shows the rule that if the running speed of the automobile is B (high), the difference in the distance between the automobiles is P (longer than the appropriate distance) and the relative speed is Z (zero), the manipulated variable is Z (maintenance of the current speed).

Figure 8A:
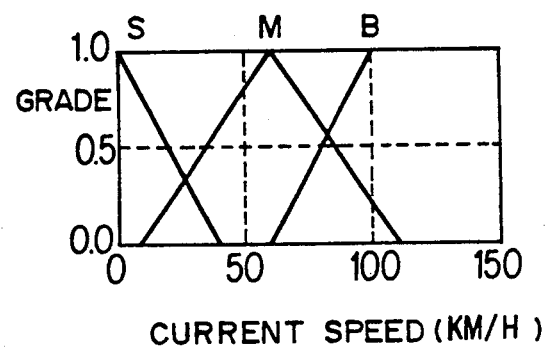
FIGS. 8(A) to 8(D) are graphs showing the membership functions in the embodiment shown in FIG. 1.
Figure 8B:
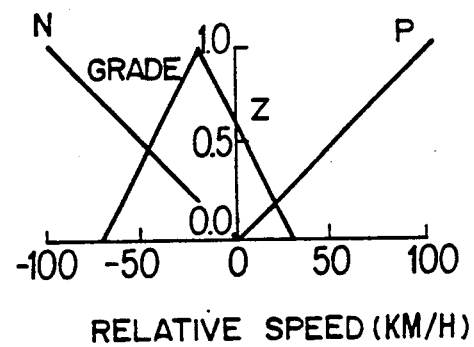
Figure 8C:
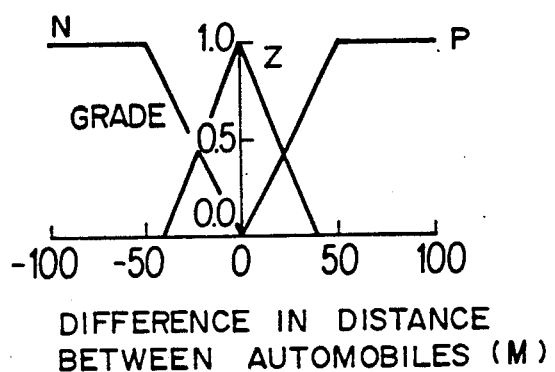
Figure 8D:
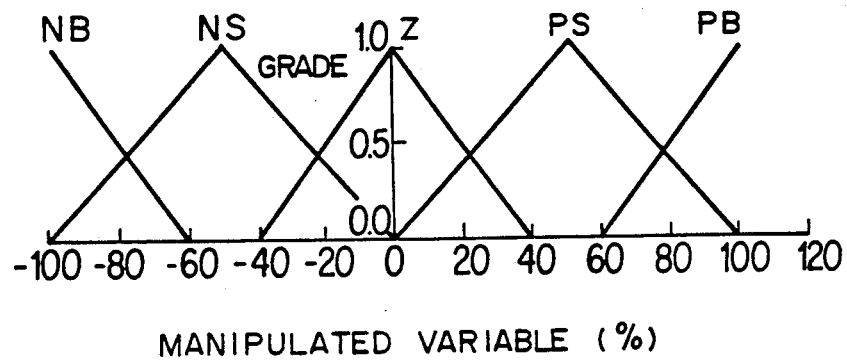

FIGS. 8(A) to 8(D) show the membership functions of the evaluation criteria used for evaluating the degree of satisfaction of these rules, wherein FIG. 8(A) shows the membership functions of S, M and B of the vehicle speed, FIG. 8(B) shows the membership functions of N, Z and P of the relative speed, FIG. 8 (C) shows the membership functions of N, Z and P of the difference in the distance between the automobiles, and FIG. 8(D) shows the membership functions of NB, NS, Z, PS and PB of the manipulated variable.

In calculating the manipulated variable, the grade each parameter is first obtanned. For example, when the difference in the distance between the automobiles is −50 m, in other words, when the actual distance between the automobiles is 50 m shorter than the appropriate distance, the vehicle speed is 100 Km/h and the relative speed is −50 Km, the respective parameters have the following grades in accordance with the respective membership functions:
  Speed of the automobile:

S=0
M=0.2
B=1.0
Difference in the distance between the automobiles:
P=Z=0
N=1.0
Relative speed:
N=Z=0.5
P=0
With respect to the rule shown in the first row of rules for fuzzy control in the table shown in FIG. 7,
Grade of the vehicle speed B=1.0
Grade of the difference N in the distance between the automobiles=1.0
Grade of the relative speed N=0.5
The degree of satisfaction in the conditional part of the rule is:

$$1.0 \times 1.0 \times 0.5 = 0.5$$

The membership function of the manipulated variable NB (large deceleration) in the conclusive part of the rule is multiplied by the degree of satisfaction in the conditional part, thereby correcting the membership function of the manipulated variable NB in correspondence with the degree of satisfaction.

This operation is carried out with all the rules for fuzzy control in FIG. 7 so as to correct the membership functions in the conclusive parts in correspondence with the degrees of satisfaction in the conditional parts. The logic sum of these corrected membership functions is then obtained. By calculating the barycenter of the logical sum, it is possible to calculate the manipulated variable which agrees with the driver's sense and supply it to the throttle actuator 40 and the brake actuator 42 in the form of a command.

As described above, in the first embodiment, speed control which agrees with a general driver's sense is enabled by using the fuzzy induction, but the thus-obtained control is not optimum to some drivers. Even the same automobile is driven at the same speed and at the same distance between the automobile and the automobile in front, the sense of danger varies with drivers. Therefore, the above-described the running state control based on merely the fuzzy induction involves a fear of automatically braking the automobile when the driver does not feel any danger or not braking the automobile when the driver wants a longer distance between the automobiles. That is, the calculated appropriate vehicle speed does not always agree with the sense of driving which varies with drivers. To solve this problem, this embodiment is provided with a self tuning means 44 as an adjusting means for automatically adjusting the degree of danger in accordance with the characteristics of the driver.

Figure 2:
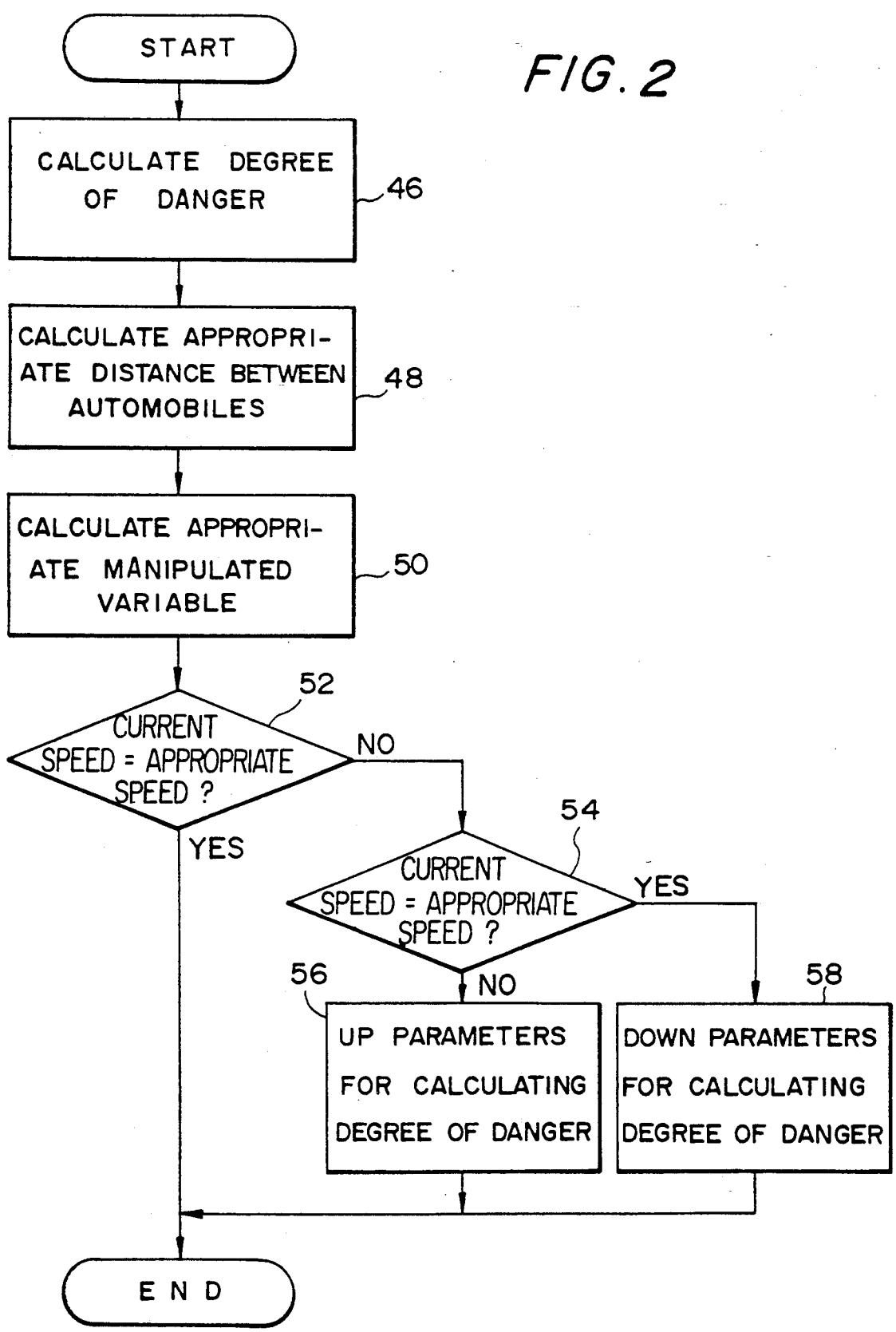
FIG. 2 is a flow chart of the embodiment shown in FIG. 1.

FIG. 2 is a flowchart of the function of the self tuning means 44. To the self tuning means 44, the manipulated variable information and the vehicle speed are input from the manipulated variable control means 38 and the speed sensor 32, respectively, and judgment is made as to whether or not the appropriate vehicle speed is equal to the current vehicle speed by a comparator (step 52). That is, when the driver changes the appropriate vehicle speed during the running state control by operating the accelerator or the brake, i.e., by overriding the automatic control by the manipulated variable control means, the current vehicle speed becomes different from the appropriate vehicle speed. Therefore, the answer No at the step 52 means that the driver has operated the accelerator or the brake.

If the answer is No, judgment is made as to whether or not the current vehicle speed is larger than the appropriate vehicle speed at the step 54. If the current vehicle speed is higher than the appropriate vehicle speed, it indicates that the driver has operated the accelerator, namely, that the appropriate vehicle speed calculated by the running state control apparatus consisting of a series of the danger index calculating means 34, the appropriate distance calculating means 36 and the manipulated variable control means 38 is not appropriate for the driver and comparatively low. If the answer is Yes at the step 54, the self tuning means 44 supplies the signal to the danger index calculating means 34 in order to change the grades of the evaluation criteria on the parameters for controlling the degree of danger in the membership functions in FIG. 5 so that the degree of danger is evaluated at a smaller grade (step 58).

On the other hand, if the current vehicle speed is lower than the appropriate vehicle speed, it indicates that the driver has operated the brake, namely, that the appropriate vehicle speed calculated by the AI-based adaptive vehicle control system consisting a series of the danger index calculating means 34, the appropriate distance calculating means 36 and the manipulated variable control means 38 is not appropriate for the driver and comparatively high. If the answer is No at the step 54, the self tuning means 44 supplies the signal to the danger index calculating means 34 in order to to change the grades of the evaluation criteria on the parameters for controlling the degree of danger in the membership functions in FIG. 5 so that the degree of danger is evaluated at a larger grade (step 56).

In this way, by judging whether or not the driver has corrected the appropriate vehicle speed from the comparison between the appropriate vehicle sped and the current vehicle speed and adjusting the evaluation criteria on the parameters for calculating the degree of danger so as to lower the degree of danger when the driver has operated accelerator and raise the degree of danger when the driver has operated the brake, the degree of danger calculated by the danger index calculating means 34 is adjusted to the value which agrees with the driver's sense of driving. Therefore, the number of times the driver operates the accelerator or the brake is gradually reduced, thereby enabling comfortable automatic follow-up driving.

As explained above, according to the first embodiment, it is possible to automatically change the degree of danger and the appropriate distance between the automobile and the automobile in front in accordance with the driving characteristics of the driver. The driver can therefore concentrate on the steering operation or other operations and follow the automobile in front safely and comfortably.

Second Embodiment

In the first embodiment, the danger index is calculated by using the distance between the automobile and the automobile in front and the relative speed as the vehicle environment, and the speed of the automobile as the running state. In a second embodiment of the present invention, the danger index is calculated by using the relative position of the automobile and the automobile in front in addition to the distance between the automobiles and the relative speed as the vehicle environment, and the steering angle of the automobile itself in addition to the speed of the automobile as the running state.

In other words, the second embodiment enables the evaluation of the degree of danger which agrees better with the driver's sense of driving by adding the relative position of the automobile and the automobile in front and the steering angle of the automobile itself to the parameters for evaluating the degree of danger. That is, when the distance between the automobile and the automobile in front, the relative speed and the speed of the automobile are the same, the degree of danger sensed by the driver when the automobile is steered in the same direction as the relative position is generally different from the degree of danger sensed by the driver when the automobile is not steered in the same direction as the relative position. In the latter case, the driver does not sense so great a danger as in the former case.

In the second embodiment, the danger index is calculated more practically with these cases taken into consideration.

The second embodiment of the present invention will be explained hereinunder with reference to the accompanying drawings.

FIG. 9 is a block diagram of the structure of this embodiment. In FIG. 9, a scanning type laser radar apparatus 130 mounted on an automobile as an environment judging means projects a laser beam at a predetermined pulse interval so as to scan the automobile in front. The scanning laser beam is reflected from the automobile in front and the distance between the automobile and the automobile in front, the relative speed and the relative position indicating the displacement of the direction of travel of the automobile from that of the automobile in front are detected from the reflected laser beam.

The running speed of the automobile is detected by a speed sensor 132 as a state judging means and the steering angle of the automobile is detected by a steering angle sensor 133 such as a potentiometer.

The distance between the automobiles, the relative speed, the relative position and the running speed and the steering angle of the automobile itself detected by the laser radar apparatus 130, the speed sensor 32 and the steering angle sensor 133 are supplied to a danger index calculating means 134. The danger index calculating means 134 calculates the danger index which agrees with the driver's sense by the fuzzy induction based on the supplied detection signals as parameters. The fuzzy induction adopted by the danger index calculating means 134 will be explained in detail hereinunder with reference to FIGS. 10 to 12.

FIG. 10 shows the criteria on the parameters which are supplied from the laser radar apparatus 130, the speed sensor 132 and the steering angle sensor 133. As shown in FIG. 10, three evaluation criteria S (Small, high), M (Middle) and B (Big, low) are allotted to the running speed of the automobile and the distance between the automobiles, evaluation criteria L (Left), Z (Zero) and R (Right) are allotted to the relative position and the steering angle, and evaluation criteria N (Negative), Z (Zero) and P (Positive) are allotted to the relative speed. To the danger index to be calculated are allotted four evaluation criteria Vs (Very Small), S (Small), M (Middle) and B (Big, large).

FIG. 11 shows the rules for fuzzy control represented by the evaluation criteria which are allotted to the respective parameters. The rules for fuzzy control adopt a rule which agrees with a general driver's sense. For example, the first row in the table shows the rule that if the running speed of the automobile is B (high), the relative speed is N (negative), the distance between the automobile and the automobile in front is S (short), the relative position is Z (zero) and the steering angle is Z (zero), the degree of danger is B (large). The third row in the table shows the rule that if the running speed of the automobile is B (high), the relative speed is N (negative), the distance between the automobile and the automobile in front is S (short), the relative position is L (left) and the steering angle is R (right), the degree of danger is S (small).

In this way, by evaluating the degree of danger so as to agree with the actual sense even when the speed of the automobile, the relative speed and the distance between the automobile and the automobile in front are the same, the optimum evaluation of the degree of danger is enabled, as will be described later.

Figure 12A:
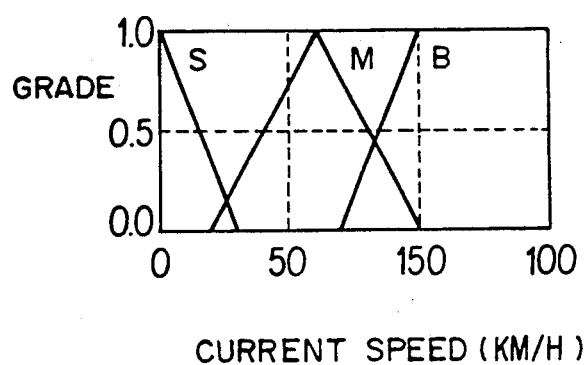
FIGS. 12(A) to 12(F) are graphs showing the membership functions in the embodiment shown in FIG. 9.
Figure 12B:
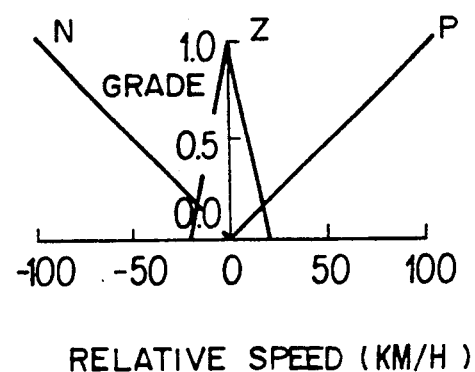
Figure 12C:
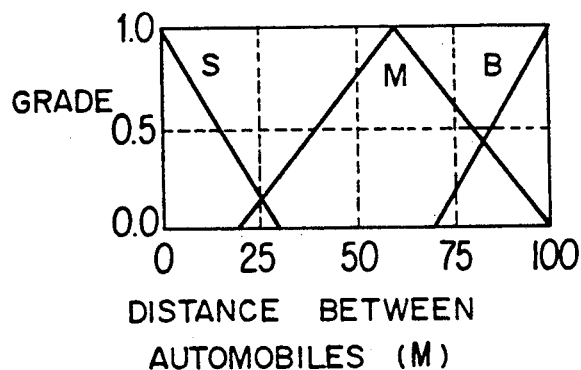
Figure 12D:
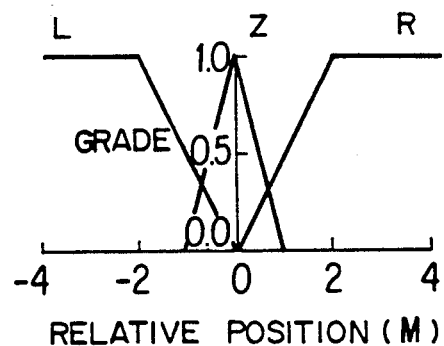
Figure 12F:
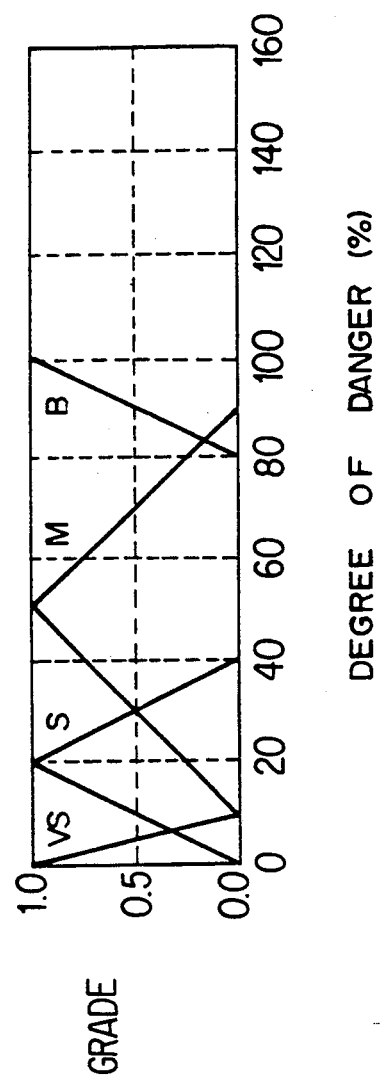
Figure 12E:
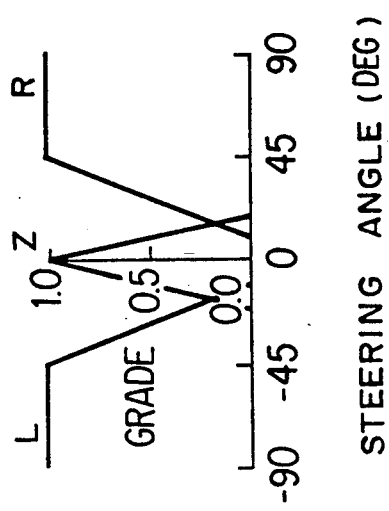
Figure 14:
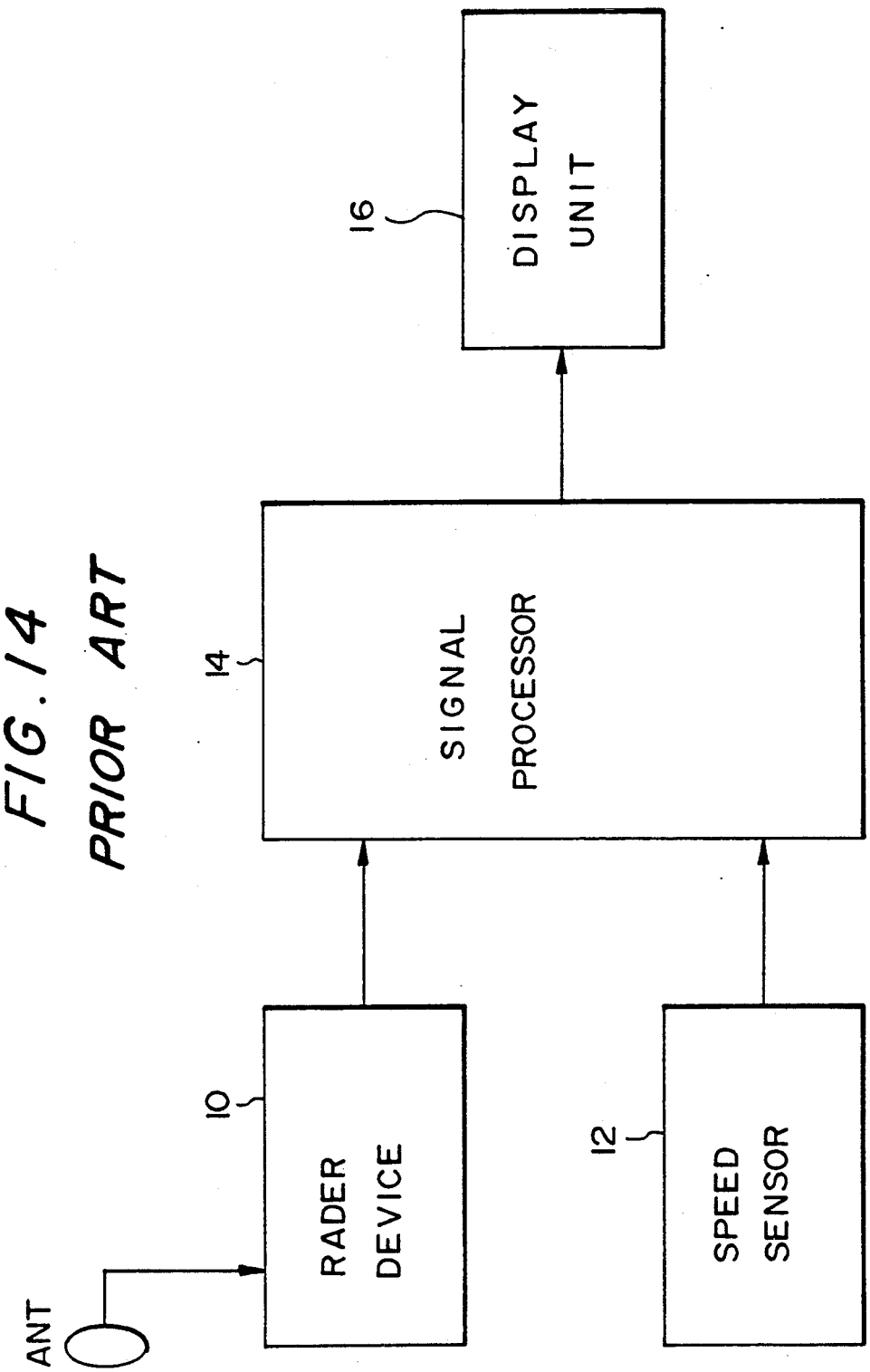
FIGS. 14 and 15 are block diagrams of conventional system and apparatus, respectively.
Figure 15:
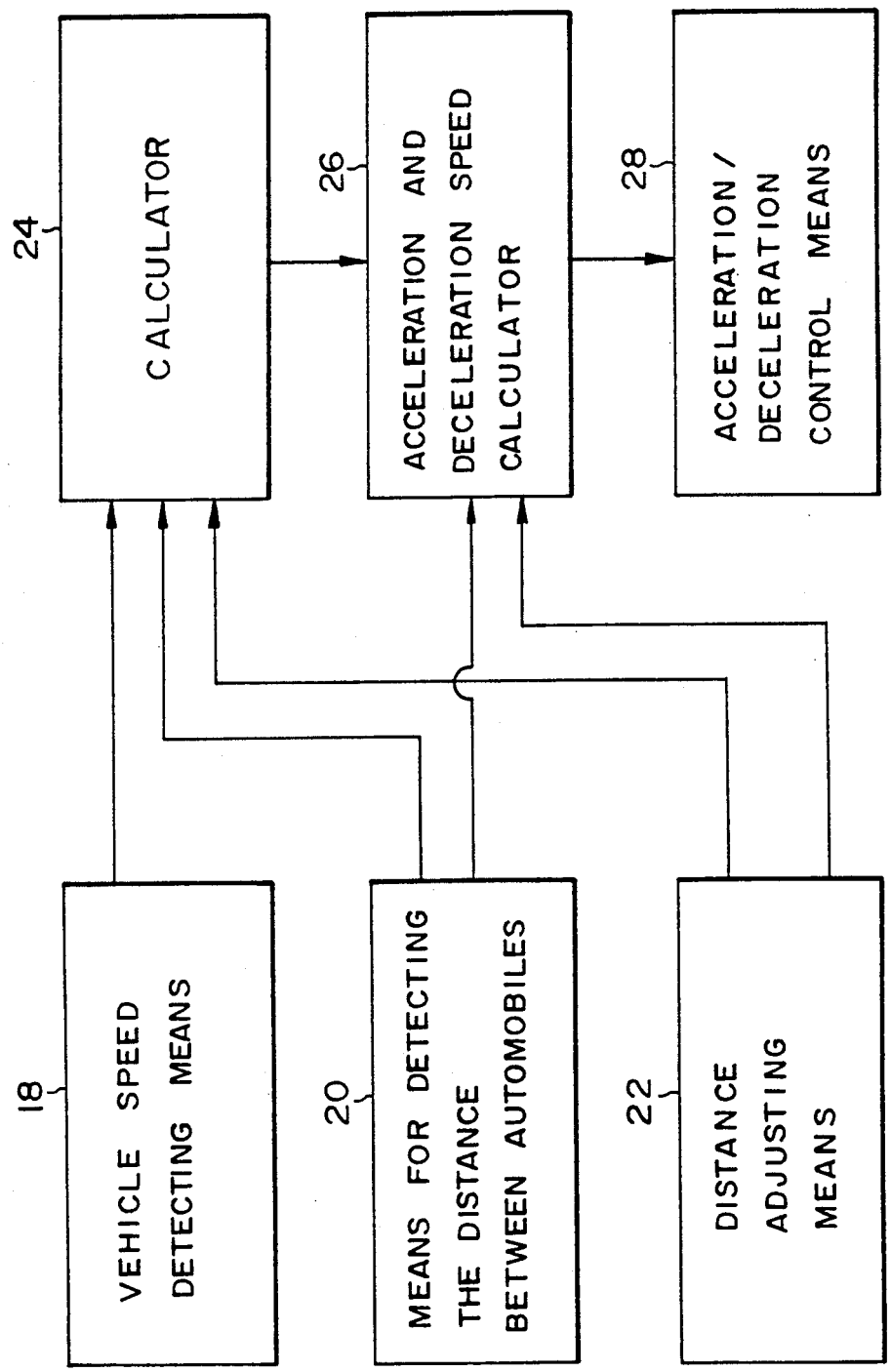

FIGS. 12(A) to 12(F) show the membership functions of the evaluation criteria allotted to the respective parameters, wherein FIG. 12(A) shows the membership functions of S (low), M (medium) and B (high) of the vehicle speed, FIG. 12(B) shows the membership functions of N (negative), Z (zero) and P (positive) of the relative speed, FIG. 12(C) shows the membership functions of S (short), M (medium) and B (long) of the distance between the automobiles, FIG. 12(D) shows the membership functions of L(left), Z (zero) and R (right) of the relative position, FIG. 12(E) shows the membership functions of L(left), Z (zero) and R (right) of the steering angle, and FIG. 12(F) sows the membership functions of VS (very small), S (small), M (medium) and B (large) of the degree of danger. As well known, the membership function represents the degree to which a physical quantity fits a person's sense in the form of a grade. For example, in the membership functions of the running speed of the automobile in FIG. 12(A), when the running speed of the automobile is 50 km/h, the grades of the respective evaluation criteria are S (low)=B (high)=0
M (medium)=0.75

That is, the running speed of 50 Km/h is judged to be medium at a grade of 0.75 by a general driver's sense.

The danger index calculating means 134 inputs the parameter values supplied from the laser radar apparatus 130, the speed sensor 132 and the steering angle sensor 133 and obtains the grades of the evaluation criteria from the membership functions of these parameters. For example, when the detected values are Speed of the automobile=100 Km/h
Relative speed=−50 Km/h
Distance between the=25 m automobiles
Relative position=−2 m
Steering angle=45 deg.

the grades of the evaluation criteria are
Speed of the automobile:
  S=M=0
  B=1.0
Relative speed:
  P=Z=0
  N=0.5
Distance between the automobiles:
  S=0.2
  M=0.2
  B=0
Relative position:
  R=Z=0
  L=1.0

Steering angle:
L=Z=0
R=1.0

From these grades, the degree of satisfaction of the rule for fuzzy control, which is the basis rule, shown in FIG. 11 is evaluated. In the above-described example, with respect to the rule shown in the third row of the table shown in FIG. 11, Grade of the speed B of the automobile=1.0
Grade of the relative speed N=0.5
Grade of the distance S between the automobiles=0.2
Grade of the relative position L=1.0
Grade of the steering angle R=1.0 and the grades of satisfaction in the conditional part of the rule is:

$$1.0 \times 0.5 \times 0.2 \times 1.0 \times 1.0 = 0.1.$$

The membership function of the degree S of danger in the conclusive part of the rule is multiplied by the degree of satisfaction in the conditional part, thereby correcting the membership function of the degree S of danger in correspondence with the degree of satisfaction.

This operation is carried out with all the rules for fuzzy control in FIG. 11 so as to correct the membership functions in the conclusive parts in correspondence with the degrees of satisfaction. The logic sum of these corrected membership functions is then obtained. By calculating the barycenter of the logical sum, it is possible to calculate the degree of danger which agrees with the driver's sense.

The degree of danger calculated by the danger index calculating means 134 is supplied to a distance calculating means 136 for calculating the appropriate distance between the automobile and the automobile in front. The distance calculating means 136 calculates the appropriate distance between the automobile and the automobile in front on the basis of the thus-supplied danger index, the relative speed supplied from the laser radar apparatus 130 and the running speed of the automobile supplied from the speed sensor 132. More specifically, the reference distance $L_0$ between the automobiles which allows the automobile to stop without bumping against the automobile in front is first obtained from the relative speed Vr and the running speed V of the automobile itself in accordance with the following formula.

$$L_0 = V \times \tau + (V_s^2 - V^2)/2a$$

$$V_s = V + V_r$$

wherein $\tau$ represents the idle running time of the automobile, and $a$ the degree of deceleration.

The reference distance $L_0$ between the automobiles is corrected by the danger index D calculated by the danger index calculating means 134, thereby obtaining the appropriate distance L between the automobiles.

$$L = G_1 \times (1+D) \times L_0$$

wherein G1 represents the gain of the distance between the automobiles.

The thus-calculated appropriate distance L between the automobiles is supplied to a manipulated variable control means 138. The manipulated variable control means 138 calculates a manipulated variable which is to be supplied to a throttle actuator 140 and a brake actuator 142 to optimize the vehicle speed on the basis of the appropriate distance between the automobiles by fuzzy induction in the same way as the danger index calculating means 134.

FIG. 13 shows the rules for fuzzy control represented by the evaluation criteria which are allotted to the respective parameters. The rules for fuzzy control adopt a rule which agrees with a general driver's sense in the same way as the rules shown in FIG. 11. For example, the first row in the table shows the rule that if the running speed of the automobile is B (high), the difference in the distance between the automobiles is N (shorter than the appropriate distance) and the relative speed is N (negative), the manipulated variable is NB (large deceleration). The sixth row in the table shows the rule that if the running speed of the automobile is B (high), the difference in the distance between the automobiles is P (longer than the appropriate distance) and the relative speed is Z (zero), the manipulated variable is Z (maintenance of the current speed).

The degree of satisfaction of these rules are evaluated by the use of each of the membership functions shown in FIG. 8.

In calculating the manipulated variable, the grade of each parameter is first obtained. For example, when the difference in the distance between the automobiles is −50 m, in other words, when the current distance between the automobiles is 50 m shorter than the appropriate distance, the vehicle speed is 100 Km/h and the relative speed is −50 Km, the respective parameters have the following grades in accordance with the respective membership functions:

Speed of the automobile:
S=0
M=0.2
B=1.0

Difference in the distance between the automobiles:
P=Z=0
N=1.0

Relative speed:
N=Z=0.5
P=0

With respect to the rule shown in the first row of rules for fuzzy control in the table shown in FIG. 13, Grade of the vehicle speed B=1.0
Grade of the difference N in the distance between the automobiles=1.0
Grade of the relative speed N=0.5

The degree of satisfaction of the conditional part of the rule is:

$$1.0 \times 1.0 \times 0.5 = 0.5$$

The membership function of the manipulated variable NB (large deceleration) in the conclusive part of the rule is multiplied by the degree of satisfaction in the conditional portion, thereby correcting the membership function of the manipulated variable NB in correspondence with the degree of satisfaction.

This operation is carried out with all the rules for fuzzy control in FIG. 13 so as to correct the membership functions in the conclusive parts in correspondence with the degrees of satisfaction in the conditional parts. The logic sum of these corrected membership functions is then obtained. By calculating the barycenter of the logical sum, it is possible to calculate the manipulated variable which agrees with the driver's sense and supply it to the throttle actuator 140 and the brake actuator 142 in the form of a command.

This embodiment as well as the first embodiment is provided with a self tuning means 144 as an adjusting means for automatically adjusting the degree of danger by the danger index calculating means 134 in accordance with the amount of change in the manipulated variable when the calculated manipulated variable is changed by the driving operation of the driver.

To the self tuning means 144, the manipulated variable information and the vehicle speed are input from the manipulated variable control means 138 and the speed sensor 132, respectively, in the same way as in the first embodiment, and the current vehicle speed is compared with the appropriate vehicle speed by a comparator. The danger index is adjusted on the basis of the comparison between the appropriate vehicle speed and the current vehicle speed by changing the grades of the evaluation criteria on the parameters for controlling the degree of danger in the membership functions shown in FIG. 8.

As described above, according to the second embodiment, the degree of danger is evaluated in accordance with the actual driver's sense of driving from the fuzzy induction while adopting the relative position which shows the displacement of the direction of travel of the automobile from the direction of travel of the automobile in front, and the steering angle as the physical quantity in addition to the distance between the automobile and the automobile in front, the relative speed and the speed of the automobile itself. In addition, when the appropriate manipulated variable calculated on the basis of the degree of danger is changed by the driver, the amount of change is fed back to the danger index calculating means 134. Thus, the number of times the driver operates the accelerator or the brake is gradually reduced, thereby enabling comfortable automatic follow-up driving.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An AI-based adaptive vehicle control system which is capable of controlling a driving condition of a vehicle by adapting said control system of the vehicle itself to driving characteristics of a driver, said control system comprising:

an environment judging means for judging a vehicle external environment;

a state judging means for judging a running state of said vehicle;

a danger index calculating means for calculating a danger index from said vehicle external environment and said running state of said vehicle in accordance with said driver's sense of driving;

a control means for optimizing said running state by controlling the running state in accordance with the calculated danger index such that the running state corresponds to an optimized running state; and an adjusting means for detecting a change in the running state controlled by the control means, due to an override driving operation by said driver for overriding the optimized running state controlled by the control means, such that the running state becomes different from the optimized running state, and for adjusting the danger index in accordance with said change.

2. An AI-based adaptive vehicle control system according to claim 1, wherein said danger index calculating means calculates said danger index from said vehicle environment and said running state by fuzzy induction from membership functions which are determined in advance in accordance with a general driver's sense of driving.

3. An AI-based adaptive vehicle control system according to claim 2, wherein said adjusting means adjusts said danger index by changing said membership functions in accordance with said change in said optimized running state.

4. An AI-based adaptive vehicle control system according to claim 3, wherein said environment judging means includes a means for measuring the distance between said vehicle and a vehicle immediately in front, and a means for measuring the relative speed of said vehicle and the vehicle immediately in front;

said state judging means includes a means for measuring the speed of said vehicle itself;

said control means includes a distance calculating means for calculating the appropriate distance between said vehicle and the vehicle immediately in front in accordance with said danger index, and a manipulated variable calculating means for calculating the manipulated variable for acceleration or deceleration for setting the speed of said vehicle at the appropriate value from said appropriate distance between said vehicle and the vehicle immediately in front, said relative speed of said vehicle and the vehicle immediately in front and said speed of said vehicle itself; and said adjusting means includes a means for detecting said change by comparing the calculated appropriate speed and the current speed of said vehicle.

5. An AI-based adaptive vehicle control system according to claim 4, wherein said manipulated variable calculating means calculates said manipulated value for acceleration or deceleration from said appropriate distance between said vehicle and the vehicle immediately in front, said relative speed of said vehicle and said vehicle immediately in front and the speed of said vehicle itself by fuzzy induction from membership functions which are determined in advance.

6. An AI-based adaptive vehicle control system according to claim 4, wherein said environment judging means includes a means for measuring the relative position of said vehicle and the vehicle immediately in front, and said state judging means includes a means for measuring the steering angle of said vehicle.

* * * * *